(12) United States Patent
Mikiya et al.

(10) Patent No.: US 7,118,089 B2
(45) Date of Patent: Oct. 10, 2006

(54) FLUID COUPLER

(75) Inventors: Toshio Mikiya, Tokyo (JP); Toru Kohda, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 143 days.

(21) Appl. No.: 10/718,684

(22) Filed: Nov. 24, 2003

(65) Prior Publication Data

US 2004/0099318 A1    May 27, 2004

(30) Foreign Application Priority Data

Nov. 25, 2002   (JP)   ............................. 2002-341069

(51) Int. Cl.
*F16L 37/28*    (2006.01)

(52) U.S. Cl. .............................. 251/149.2; 137/614.03; 137/614.04; 285/316

(58) Field of Classification Search ................ 137/614, 137/614.03, 614.04, 614.05; 251/149.2; 285/316

See application file for complete search history.

(56) References Cited

U.S. PATENT DOCUMENTS

| 4,664,149 A | * | 5/1987 | Fremy | ................... | 137/614.06 |
| 5,090,448 A | * | 2/1992 | Truchet | ................. | 137/614.03 |
| 5,893,391 A | * | 4/1999 | Jenski, Jr. | .............. | 137/614.04 |
| 6,131,961 A | * | 10/2000 | Heilmann | ................... | 285/316 |
| 6,568,717 B1 | * | 5/2003 | Le Clinche | ................. | 285/315 |

FOREIGN PATENT DOCUMENTS

| JP | 48-20669 Y1 | 6/1973 |
| JP | 58-160692 | 9/1983 |
| JP | 60-5181 Y2 | 2/1985 |

* cited by examiner

*Primary Examiner*—Kevin Lee
(74) *Attorney, Agent, or Firm*—Wenderoth, Lind & Ponack, L.L.P.

(57) ABSTRACT

A fluid coupler has a female coupler member and a male coupler member which can be connected to the female coupler member by simply being inserted into the female coupler member. The female coupler member includes a first locking ball, a second locking ball and a locking ball confining ring. The confining ring has a first slanted inner surface engaging the first locking ball to partly project the first locking ball into a male coupler member receiving hole of the female coupler. The confining ring further has a second slanted inner surface and a locking ball pressing surface extending in parallel with an axis of the male coupler member receiving hole. In an insertion operation, the male coupler member first engages the first locking ball to press it against the first slanted surface, thereby axially moving the confining ring. This movement of the ring disengages the locking ball pressing surface from the second locking ball so that the second locking ball is forced by the male coupler member against the second slanted surface to move the confining ring. Upon completion of insertion of the male coupler member, a recess formed in an outer surface of the male coupler member is radially aligned with the first and second locking balls which have been moved radially outwardly and, then, receives these locking balls thereinto, whereby the locking ball confining ring returns to its initial position wherein the first slanted surface and the locking ball pressing surface engage the first locking ball and second locking ball, respectively. Accordingly, even if an excessive pulling force is applied to the male coupler member, the locking ball pressing surface prevents the second locking ball from being moved radially to thereby positively retain the male coupler member in the female coupler member.

9 Claims, 22 Drawing Sheets

FLUID COUPLER

BACKGROUND OF THE INVENTION

This invention relates to a fluid coupler comprising male and female coupler members.

A fluid coupler comprises a female coupler member and a male coupler member adapted to be inserted into and detachably connected to the female coupler member. The male and female coupler members are securely connected to each other by engagement of locking balls provided in the female coupler member with an annular locking ball receiving recess formed on an exterior surface of the male coupler member. To insert the male coupler member into the female coupler member, an operator needs to shift a locking ball confining sleeve provided on the female coupler member, which has confined the locking balls to a position in which the locking balls partly project into a male coupler receiving hole of the female coupler member for engagement with the locking ball receiving recess, against a spring force to a position where the sleeve allows the locking balls to be moved radially outwardly by the male coupler member.

There is another type of fluid coupler in which a locking ball confining sleeve of a female coupler member has a slanted or conical interior surface for engaging with locking balls. The sleeve is urged by a spring to a position where the slanted or conical interior surface engages with locking balls and positions them at a recess engaging position where the locking balls engage with a locking ball receiving recess of a male coupler member. An operator can insert the male coupler member into the female coupler member by simply pushing the former into the latter so that the locking ball confining sleeve is shifted by a force applied by the male coupler member to the slanted or conical interior surface through the locking balls with the spring being compressed. When the male coupler member is completely inserted into the female coupler member, the locking ball confining sleeve is returned by the spring to an initial position where the slanted or conical interior surface confines the locking balls in the locking ball receiving recess. However, this type of fluid coupler involves a problem in that the male coupler member may be accidentally disconnected from the female coupler member. Namely, if a large pulling force is (accidentally) applied to the male coupler member, a locking ball is urged by the male coupler member against the slanted or conical interior surface of the sleeve and moves or displaces the locking ball confining sleeve from its locking ball confining position.

To solve this problem, another type of fluid coupler has been developed wherein a cylindrical support member is provided inside a female coupler member such that the cylindrical support member is urged to a position where the cylindrical support member supports locking balls to prevent the locking balls from projecting into a male coupler member receiving hole, thereby allowing a male coupler member to be inserted into the female coupler member. When the male coupler member is inserted into the female coupler member, the male coupler member pushes the cylindrical support member rearwards and, when the male coupler member has been completely inserted into the female coupler member, a locking ball receiving recess of the male coupler member is radially aligned with the locking balls, whereby a locking ball confining sleeve is shifted by under a spring force to its locking ball confining position, so that the locking balls are moved radially inwardly into and confined in the locking ball receiving recess by the locking ball confining sleeve. While this type of fluid coupler solves a problem of accidental disconnection, it involves another problem; namely, its size, i.e., since the cylindrical support member is provided inside the female coupler member, a size of the female coupler member must be made relatively large as compared with other types of fluid couplers mentioned above.

SUMMARY OF THE INVENTION

An object of this invention is to provide a fluid coupler having a novel fastening mechanism which enables an operator to securely connect a male coupler member to a female coupler member by simply inserting the former into the latter, and which does not give rise to problems stated relative to the prior art fluid couplers.

Another object of this invention is to provide a coupler member which may be employed in such a novel fluid coupler.

According to one aspect of this invention, there is provided a fluid coupler comprising:
  a female coupler member; and
  a male coupler member;

wherein the female coupler member comprises:
  (i) a cylindrical member including an axial through hole having a first opening end for receiving the male coupler member and a second opening end opposite to the first opening end, the cylindrical member further including
    (a) a first radial through hole radially extending through the cylindrical member, and
    (b) a second radial through hole radially extending through the cylindrical member, the first radial through hole being positioned nearer to the first opening end than is the second radial through hole;
  (ii) a first locking ball received in the first radial through hole such that the first locking ball is radially movable in the first radial through hole;
  (iii) a second locking ball received in the second radial through hole such that the second locking ball is radially movable in the second radial through hole;
  (iv) a locking ball confining ring axially slidably disposed around the cylindrical member and having an inner surface formed with
    (a) a first locking ball relieving portion enabling the first locking ball to move radially outwardly to allow the male coupler member to be inserted into the axial through hole passing the first locking ball,
    (b) a first slanted portion extending radially inwardly from the first locking ball relieving portion in a direction toward one of the first and second opening ends, the slanted portion being axially aligned and engaged with the first locking ball,
    (c) a second locking ball relieving portion enabling the second locking ball to move radially outwardly to allow the male coupler member to advance in the axial through hole passing the second locking ball,
    (d) a second slanted portion extending radially inwardly from the second locking ball relieving portion in the direction toward one of the first and second opening ends, the second slanted portion being axially aligned and engaged with the second locking ball, and
    (e) a second locking ball pressing portion axially extending from a radially inward end of the second slanted portion; and
  (v) a spring urging the locking ball confining ring towards the other of the first and second opening ends;
  wherein
    (1) when the male coupler member is not inserted into the female coupler member, the first locking ball is engaged by the first slanted portion to partly extend into the axial through hole, and the second locking ball is engaged by the second ball pressing portion to partly extend into the axial through hole, (2) when the first locking ball is engaged by the male coupler member, which is being inserted into the axial through hole from the first opening end, the first locking ball is forcibly moved radially outwardly while moving the locking ball confining ring in an axial direction under a force applied by the first locking ball to the first slanted portion, thereby allowing the male coupler member to advance into the axial through hole, (3) when the male coupler member comes into engagement with the second locking ball after passing the first locking ball, the locking ball confining ring has been moved such that the locking ball pressing portion disengages from the second locking ball, thereby allowing the second locking ball to be moved radially outwardly to allow the male coupler member to advance further, and (4) the male coupler member has an annular groove formed in the outer surface thereof which is radially aligned with the first and second locking balls, which have been moved radially outwardly to the first and second locking ball relieving portions, respectively, to receive the first and second locking balls thereinto so that the locking ball confining ring is returned by the spring to an initial position which the sleeve takes when the male coupler member is not inserted into the axial through hole of the female coupler member.

According to another aspect of the present invention, there is provided a coupler member of a fluid coupler comprising a cylindrical member having an axial through hole; and a valve mechanism disposed in the axial through hole of the cylindrical member;

the valve mechanism comprising:

(i) a valve holder slidably disposed in the axial through hole, the valve holder being axially movable in the axial though hole between an opening position and a closing position, (ii) a rotatable valve, (iii) a pivotal shaft for pivotally supporting the rotatable valve about a pivotal axis extending transversely with respect to the valve holder, and (iv) a cam mechanism for effecting a rotational movement of the rotatable valve about the pivotal axis between an opening angular position wherein the rotatable valve allows fluid to flow through the coupler member, and a closing angular position wherein the rotatable valve prevents fluid from flowing through the coupler member, in response to movement of the valve holder between the opening position and the closing position, respectively, the cam mechanism having a cam profile hole extending through the rotatable valve, and a pin arranged such that the pin extends through the cam profile hole, wherein the cam profile hole cooperates with the pin such that when the valve holder is moved between the opening and closing positions, the pin engages with a wall defining the cam profile hole so that the rotatable valve is rotated between the opening angular position and the closing angular position.

BRIEF DESCRIPTION OF THE DRAWINGS

These and other features, aspects, and advantages of the present invention will become apparent with reference to the following description, claims and accompanying drawings, wherein

DETAILED DESCRIPTION OF THE PREFERRED EMBODIMENTS

Figure 1:
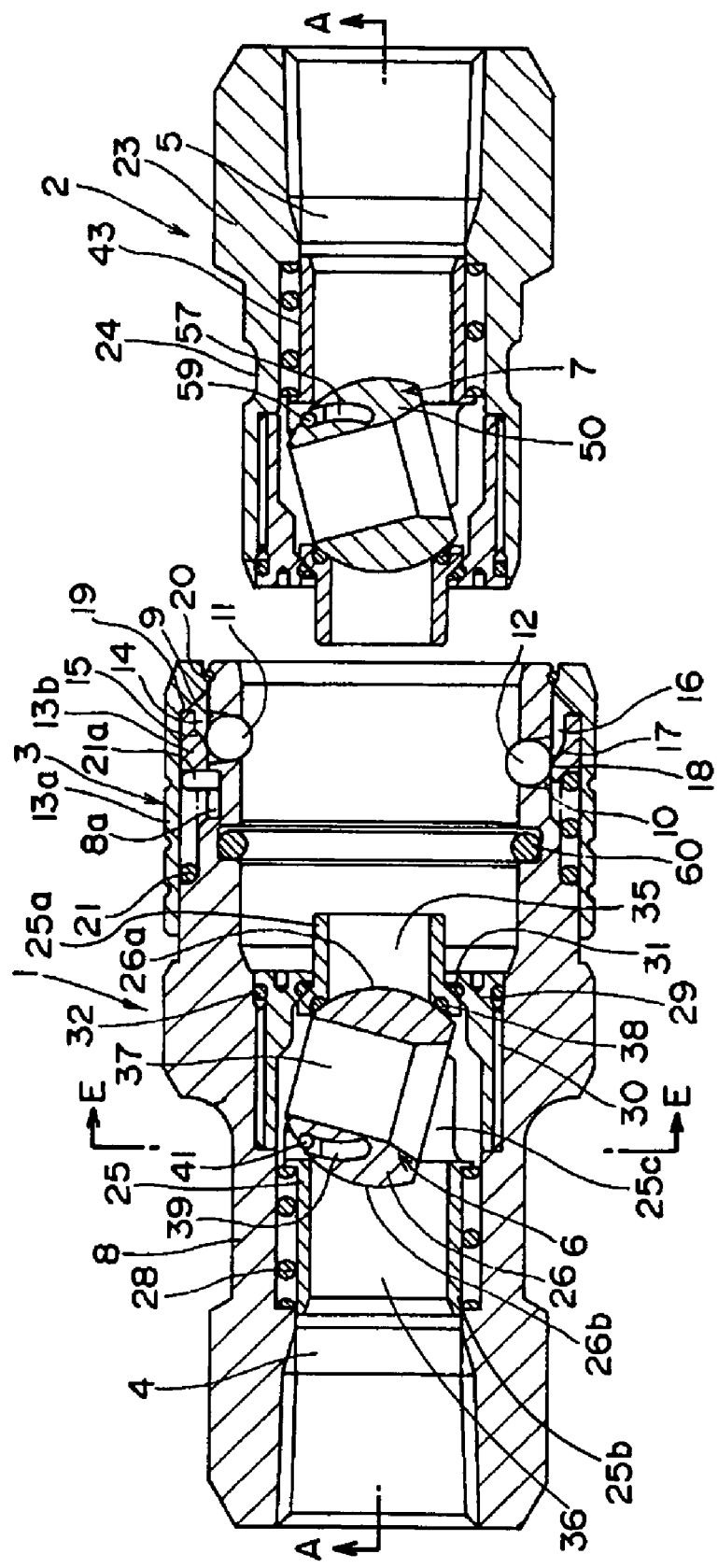
FIG. 1 is a longitudinal cross-sectional view of a fluid coupler in accordance with the present invention showing a condition in which male and female coupler members are disconnected from each other.

With reference to the accompanying drawings, there is shown a fluid coupler in accordance with the present invention having a female coupler member 1 and a male coupler member 2. The female coupler member 1 has a locking mechanism 3, as explained below, for securely connecting the male coupler member 2 to the female coupler member 1.

The female coupler member 1 has a cylindrical member 8 including: an axial through hole 4; a plurality of first radial through holes 9 which are spaced apart from each other in a circumferential direction, and which respectively radially extend through the cylindrical member 8; a plurality of second radial through holes 10 which are spaced apart form each other in a circumferential direction, and which respectively radially extend through the cylindrical member 8; a plurality of first locking balls 11 respectively received in the first radial through holes 9 such that the first locking balls 11 are radially movable in the first radial through holes 9; and, a plurality of second locking balls 12 respectively received in the second radial through holes 10 such that the second locking balls 12 are radially movable in the second radial through holes 10. Further, a locking ball confining ring 13b is axially slidably disposed around the cylindrical member 8.

Figure 5:
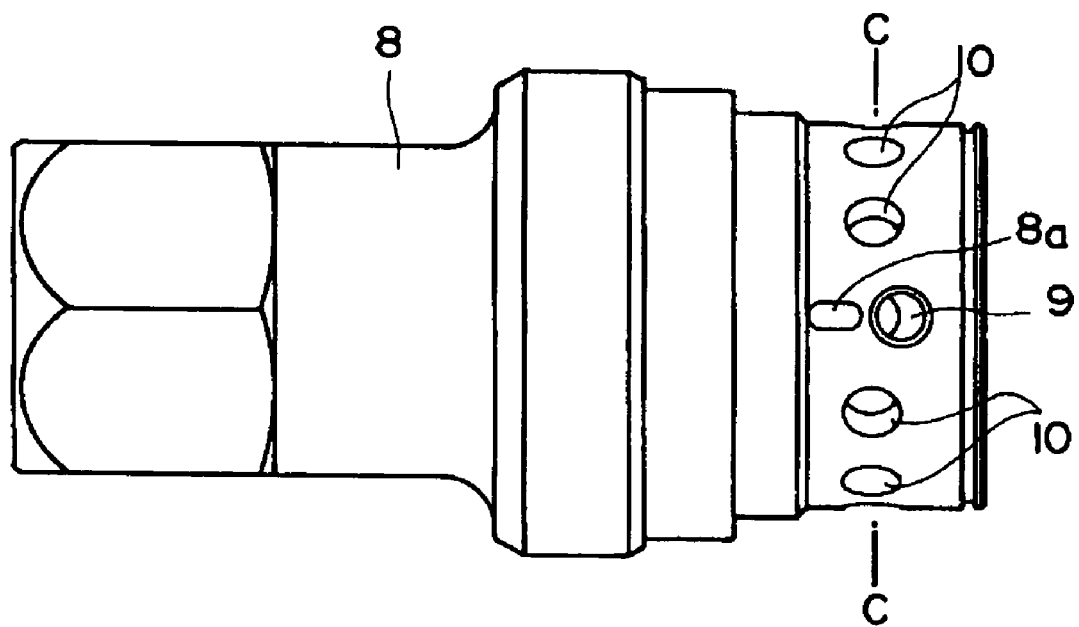
FIG. 5 is a plan view of a cylindrical coupler member of the fluid coupler shown in FIG. 1.
Figure 6:
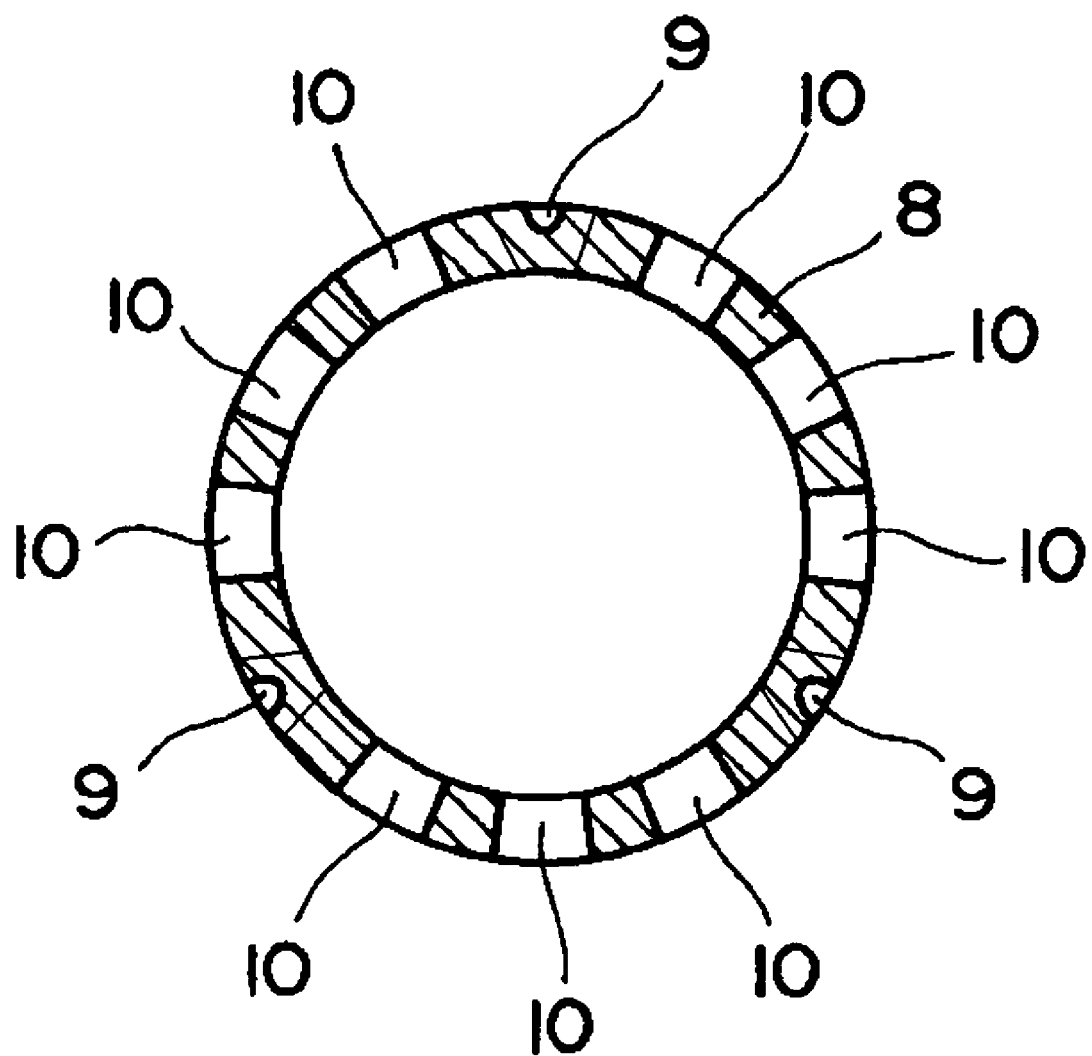
FIG. 6 is a view taken along line C—C in FIG. 5.
Figure 9A:
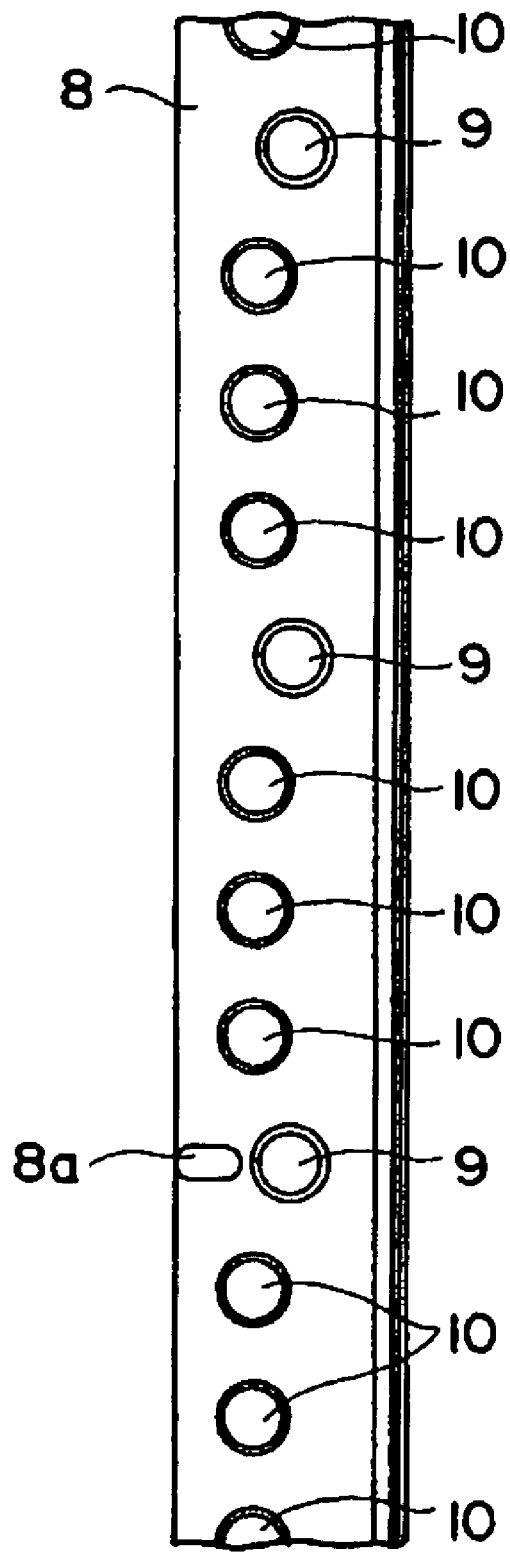
FIG. 9a is a view of a forward portion of a cylindrical member of the female coupler member of FIG. 1, which is split at a position in its circumferential direction and unfolded to be flat to show a positional relationship of first and second radial through holes formed in the forward portion of the cylindrical member.

As shown in FIG. 5 and FIG. 9a, the first radial through holes 9 are positioned closer than the second radial through holes 10 to an opening end of the axial through hole 4 for receiving the male coupler member 2. The radial through holes 9 and 10 are tapered radially inwardly to prevent the locking balls 11 and 12 from moving out from the radial through holes 9 and 10.

Figure 7:
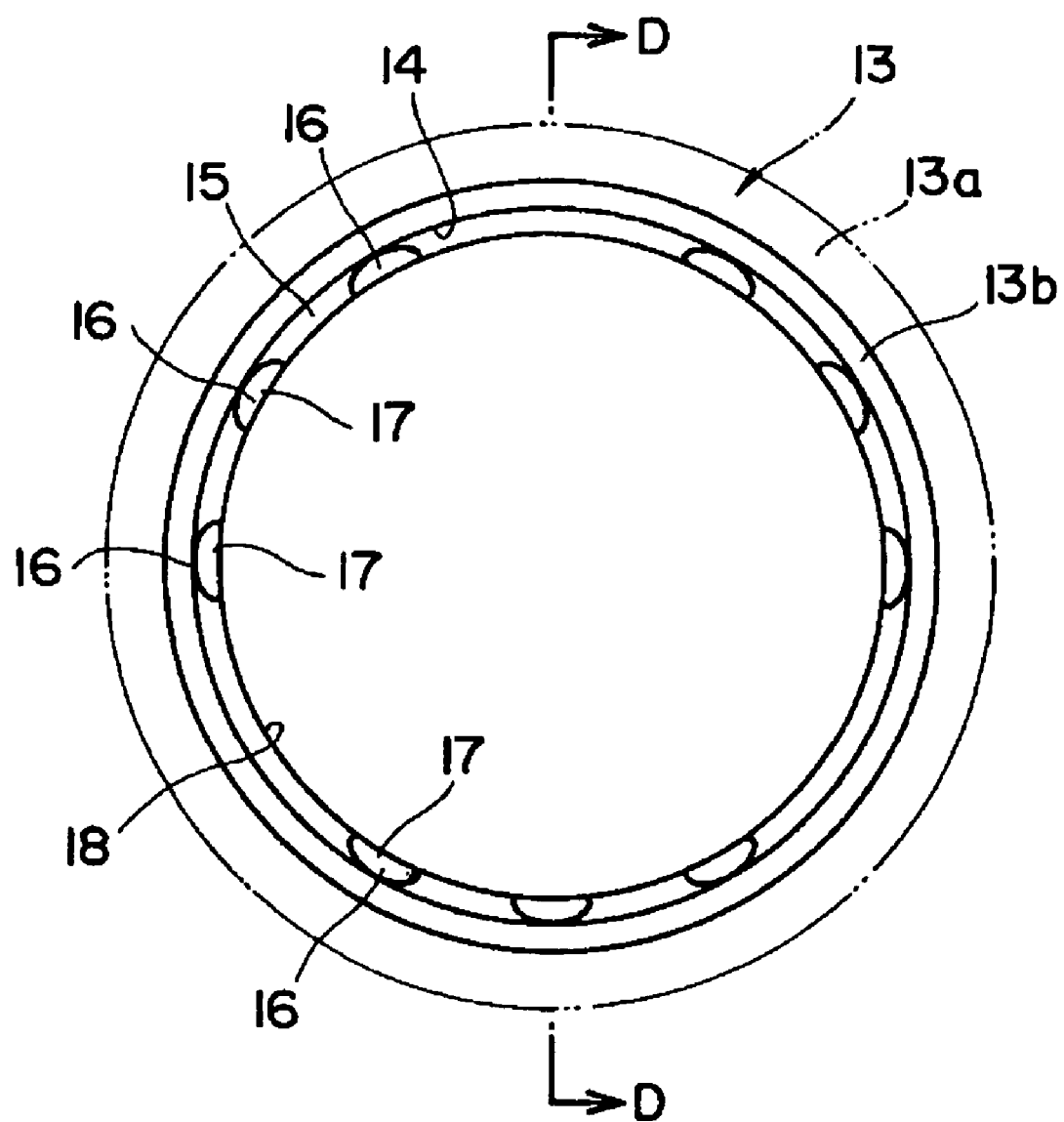
FIG. 7 is a front view of a locking ball confining ring employed in the fluid coupler shown in FIG. 1.
Figure 8:
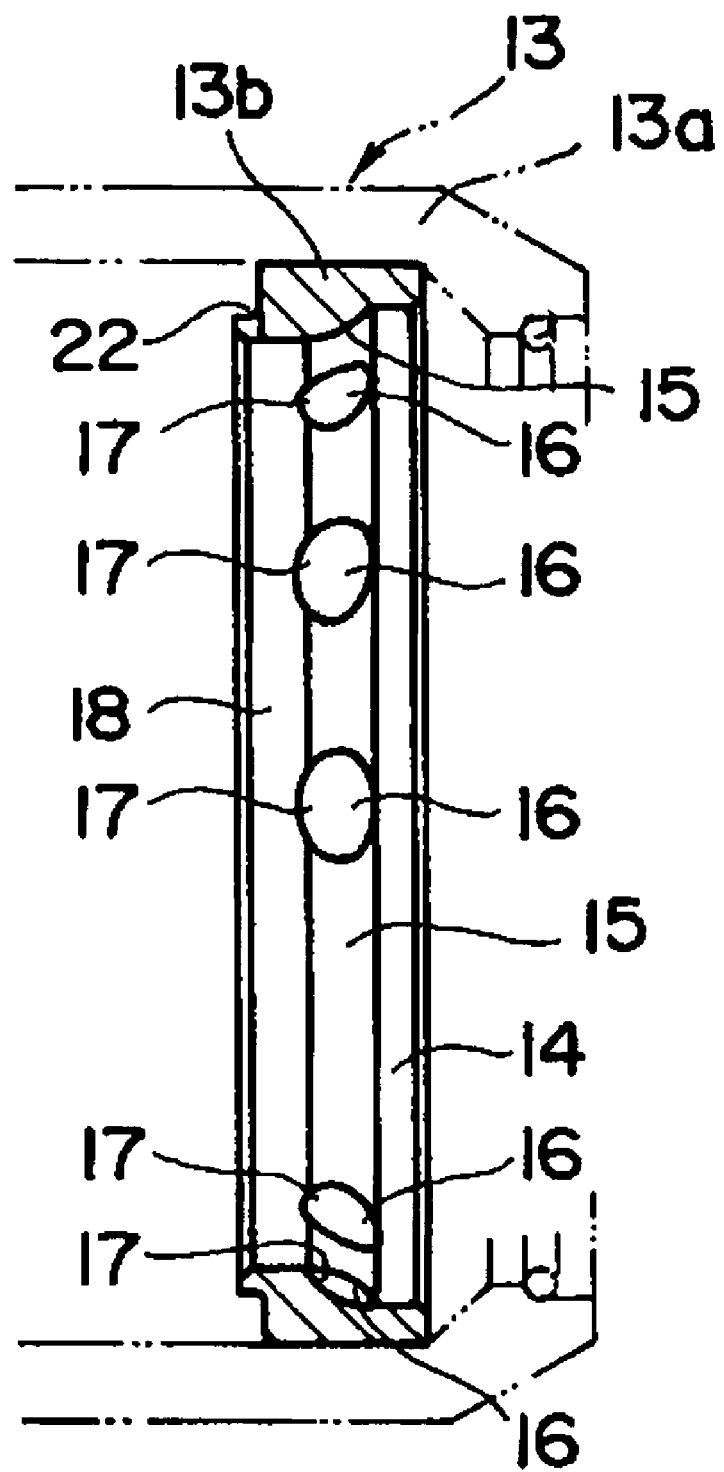
FIG. 8 is a view taken along line D—D in FIG. 7.
Figure 9B:
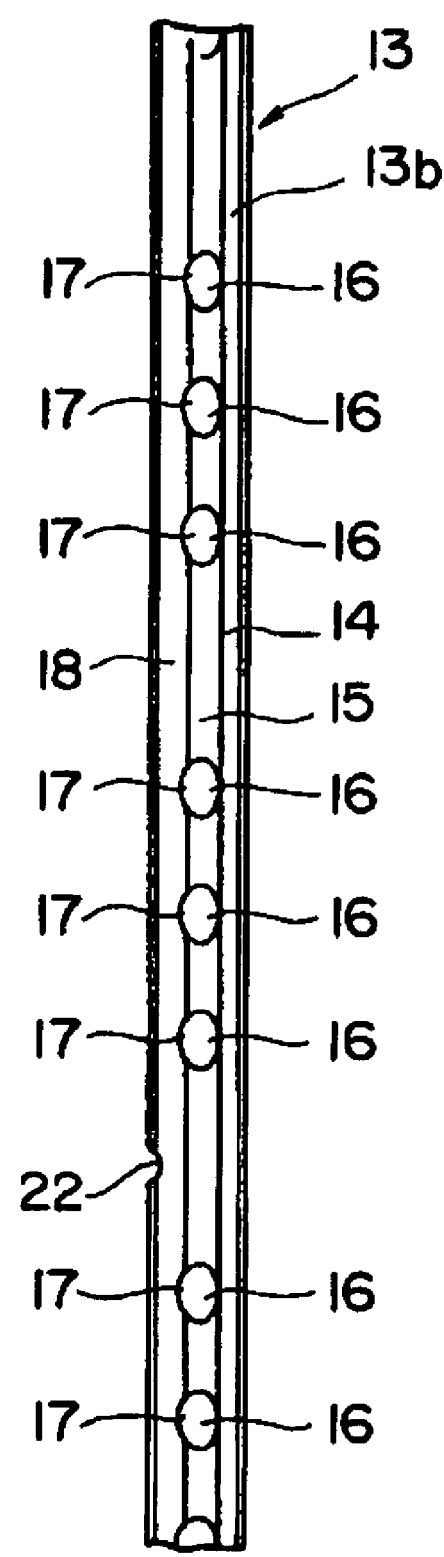
FIG. 9b is a view of a locking ball confining ring employed in the female coupler member, which is split at a position in its circumferential direction and unfolded to be flat to show an interior surface of the locking ball confining ring.

FIG. 7 is a front view of a locking ball confining ring 13b, and FIG. 8 is a view taken along line D—D in FIG. 7. FIG. 9b is a view of the locking ball confining ring 13a which is, for the sake of clarity of illustration, split at a position in its circumferential direction and unfolded to be flat to show an interior surface of the locking ball confining ring 13b. As will be understood from FIGS. 1, 7, 8 and 9b, an inner surface of the locking ball confining ring 13b has a first annular surface or first locking ball relieving portion 14; a second annular surface or second locking ball pressing portion 18 axially spaced away from the first annular surface 14, and having a diameter smaller than that of the first annular surface 14; a conical surface or slanted annular portion 15 extending between the first annular surface or first locking ball relieving portion 14 and the second annular surface or second locking ball pressing portion 18; and, a plurality of recesses or second slanted portions 17 extending from a portion on the second annular surface 18 adjacent to the slanted annular surface 15 through the annular slanted surface 15 towards the first annular surface or first locking ball relieving portion 14. A portion of the recesses 17 forms a second ball relieving portion 16.

Figure 12:
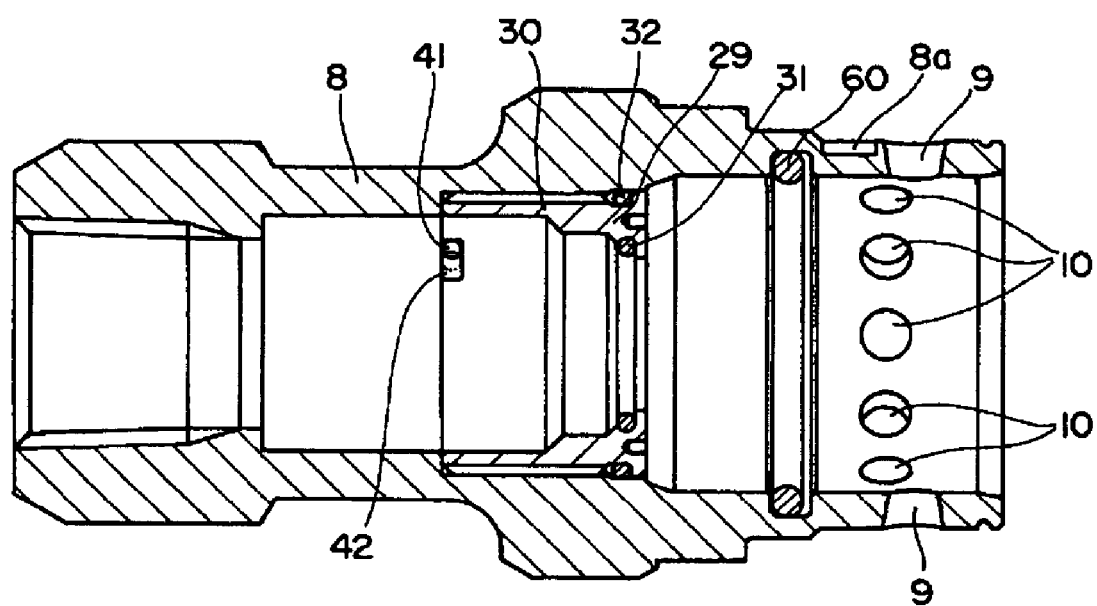
FIG. 12 is a longitudinal cross-sectional view of the cylindrical member of the female coupler member.
Figure 13:
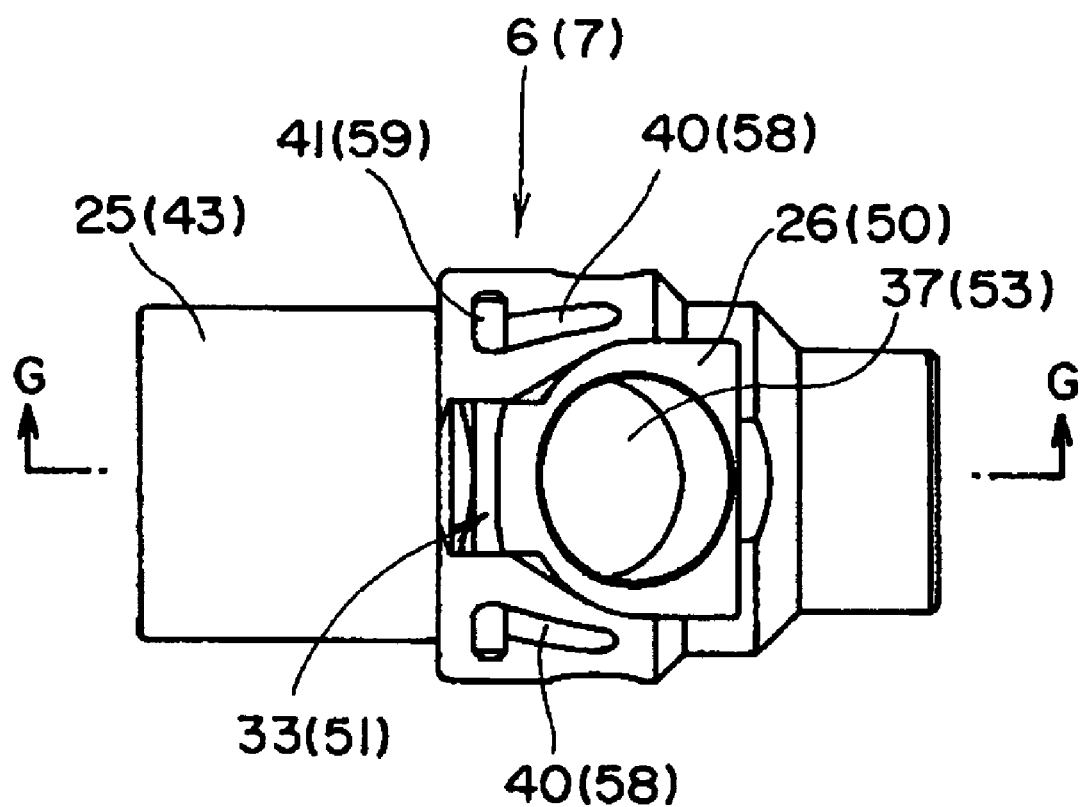
FIG. 13 is a plan view of a valve employed in the fluid coupler of FIG. 1 under a closing condition.
Figure 14:
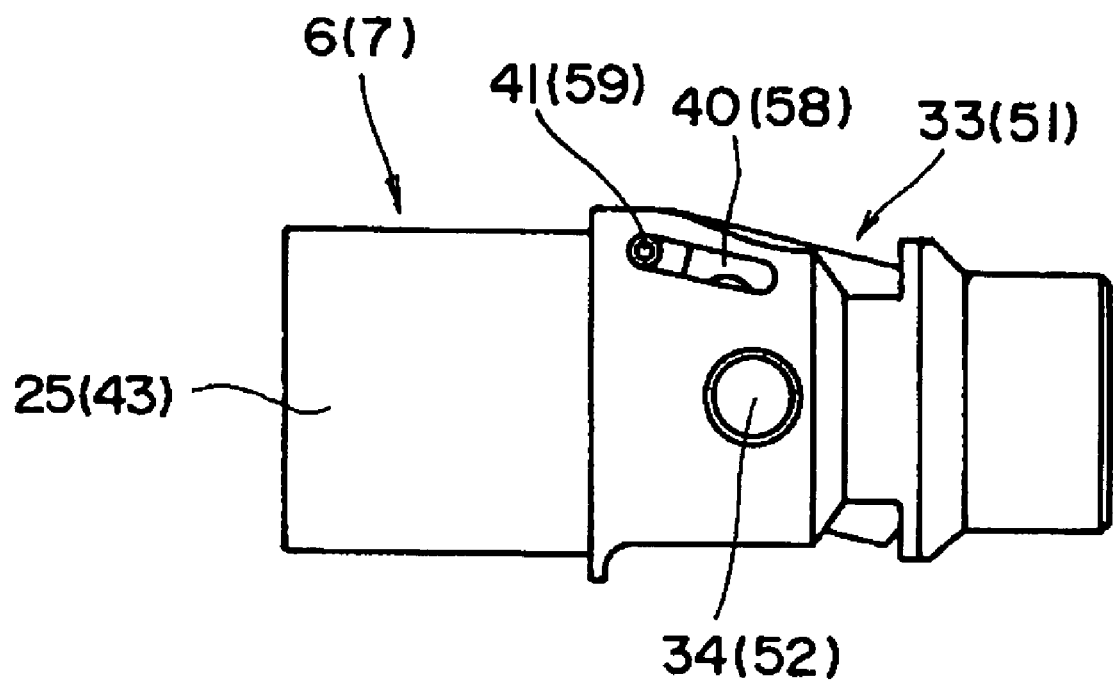
FIG. 14 is a side elevational view of the valve of FIG. 13.
Figure 15:
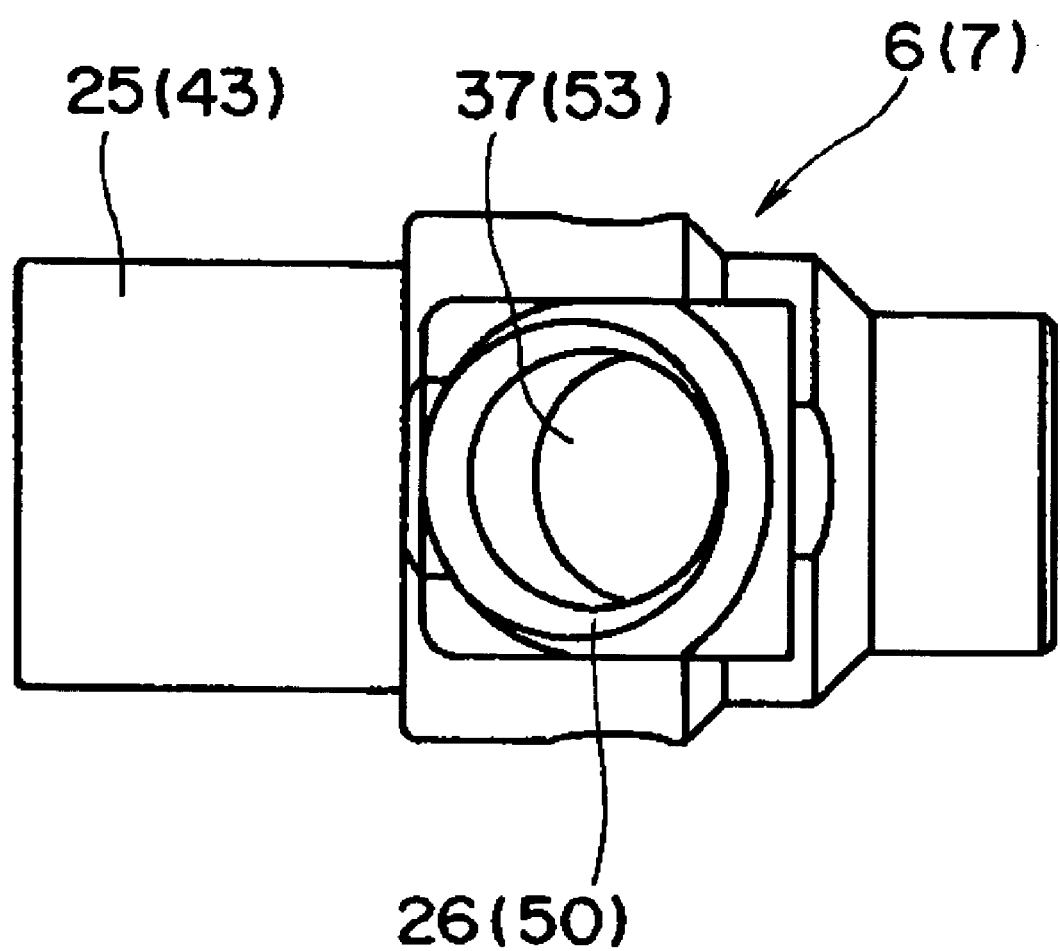
FIG. 15 is a bottom view of the valve of FIG. 13.
Figure 16:
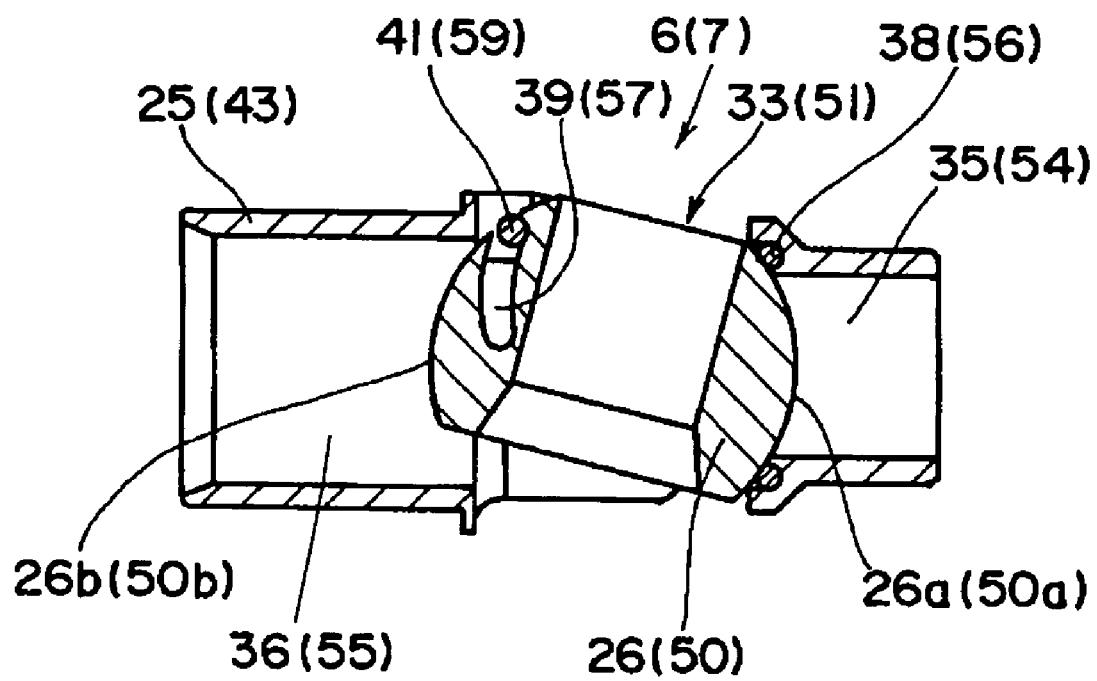
FIG. 16 is a view taken along line G—G in FIG. 13.
Figure 17:
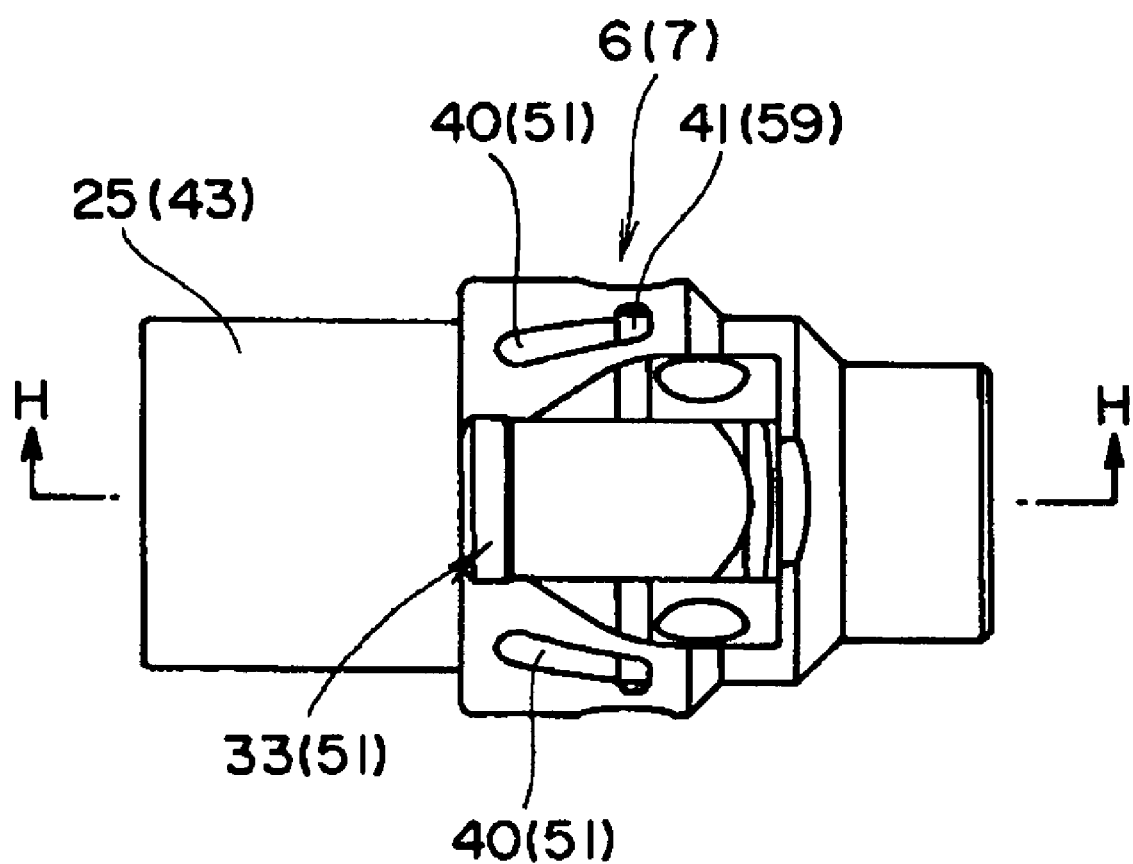
FIG. 17 is a plan view of the valve of FIG. 13 under an opening condition.
Figure 18:
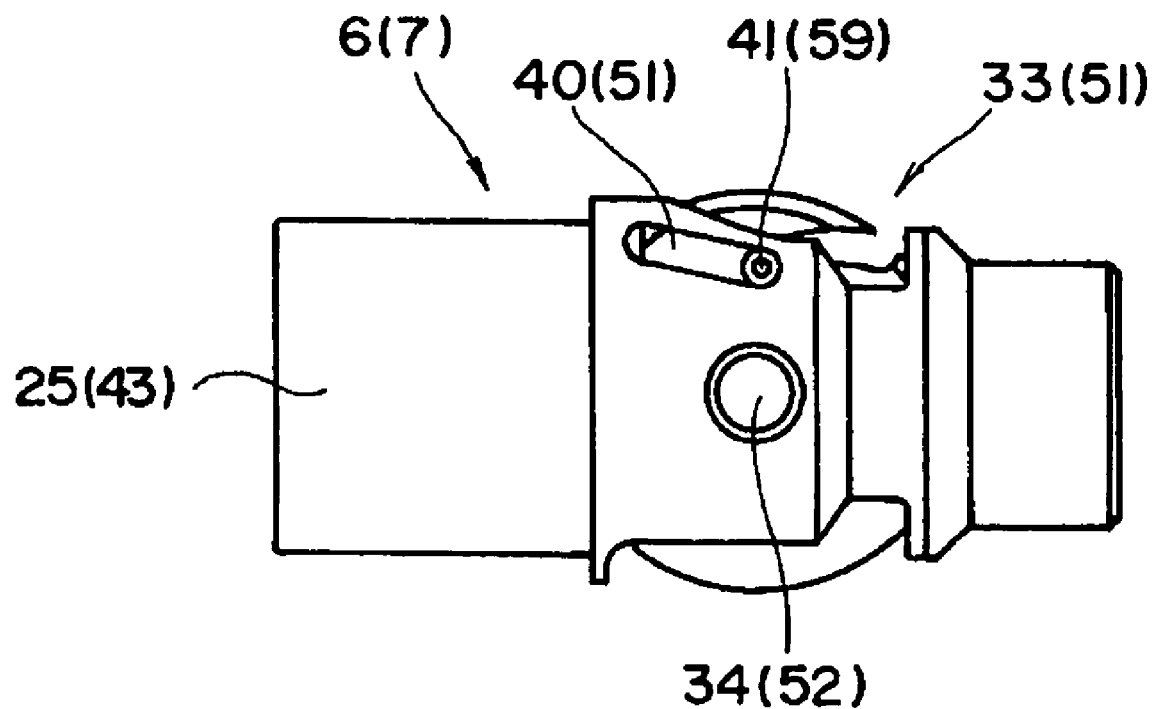
FIG. 18 is a side elevational view of the valve of FIG. 17.
Figure 19:
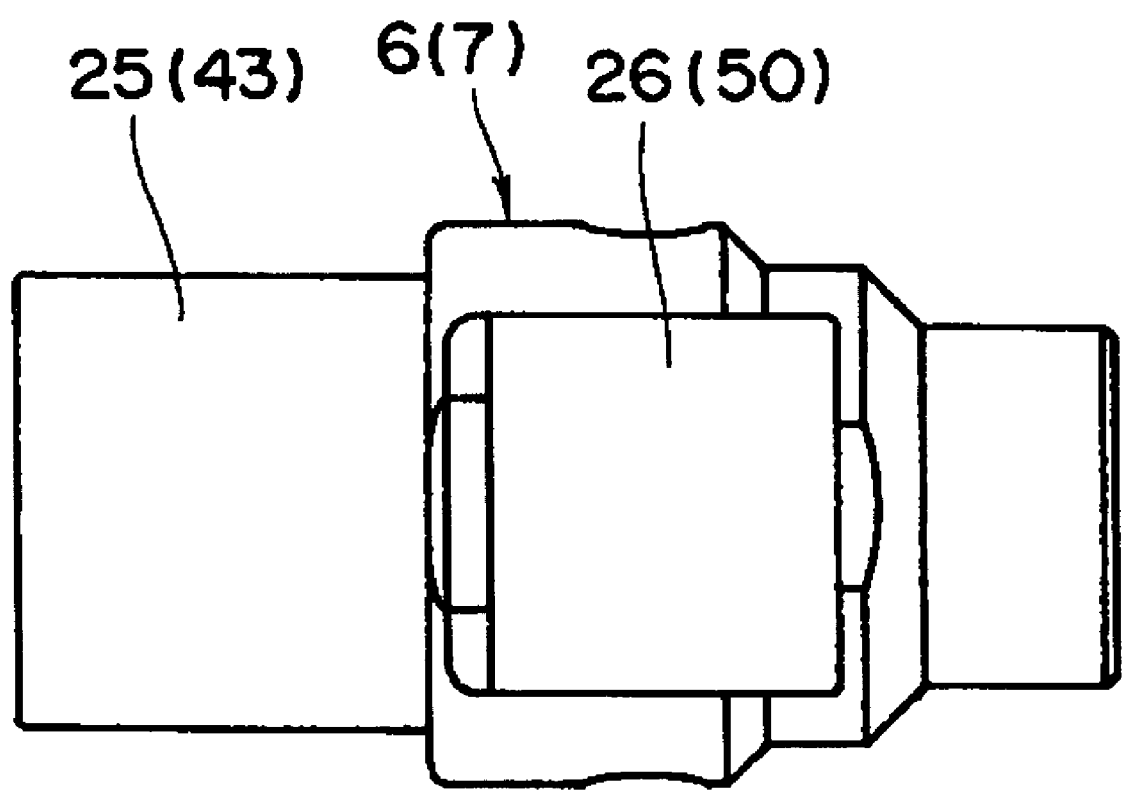
FIG. 19 is a bottom view of the valve of FIG. 17.
Figure 20:
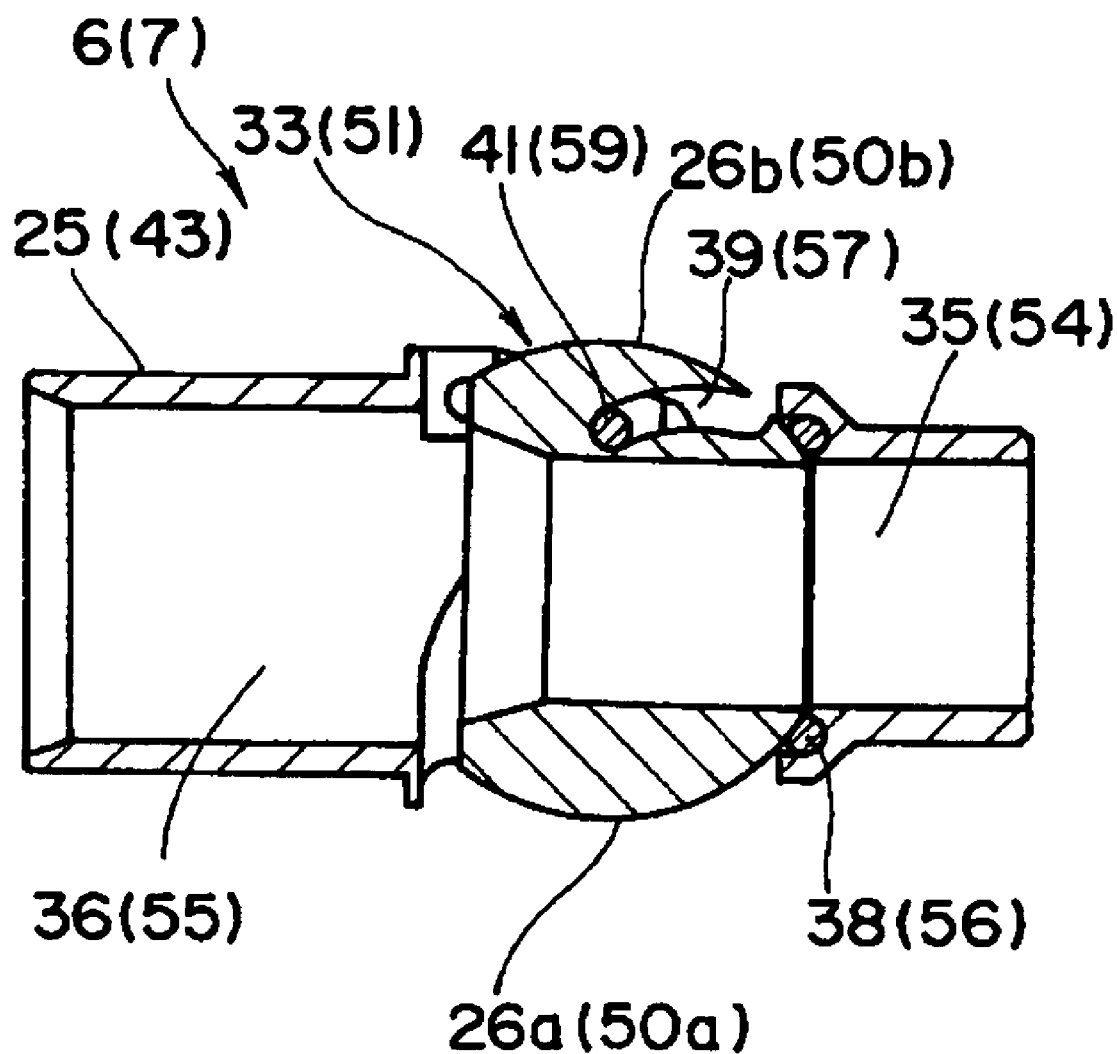
FIG. 20 is a view taken along line H—H in FIG. 17.
Figure 21:
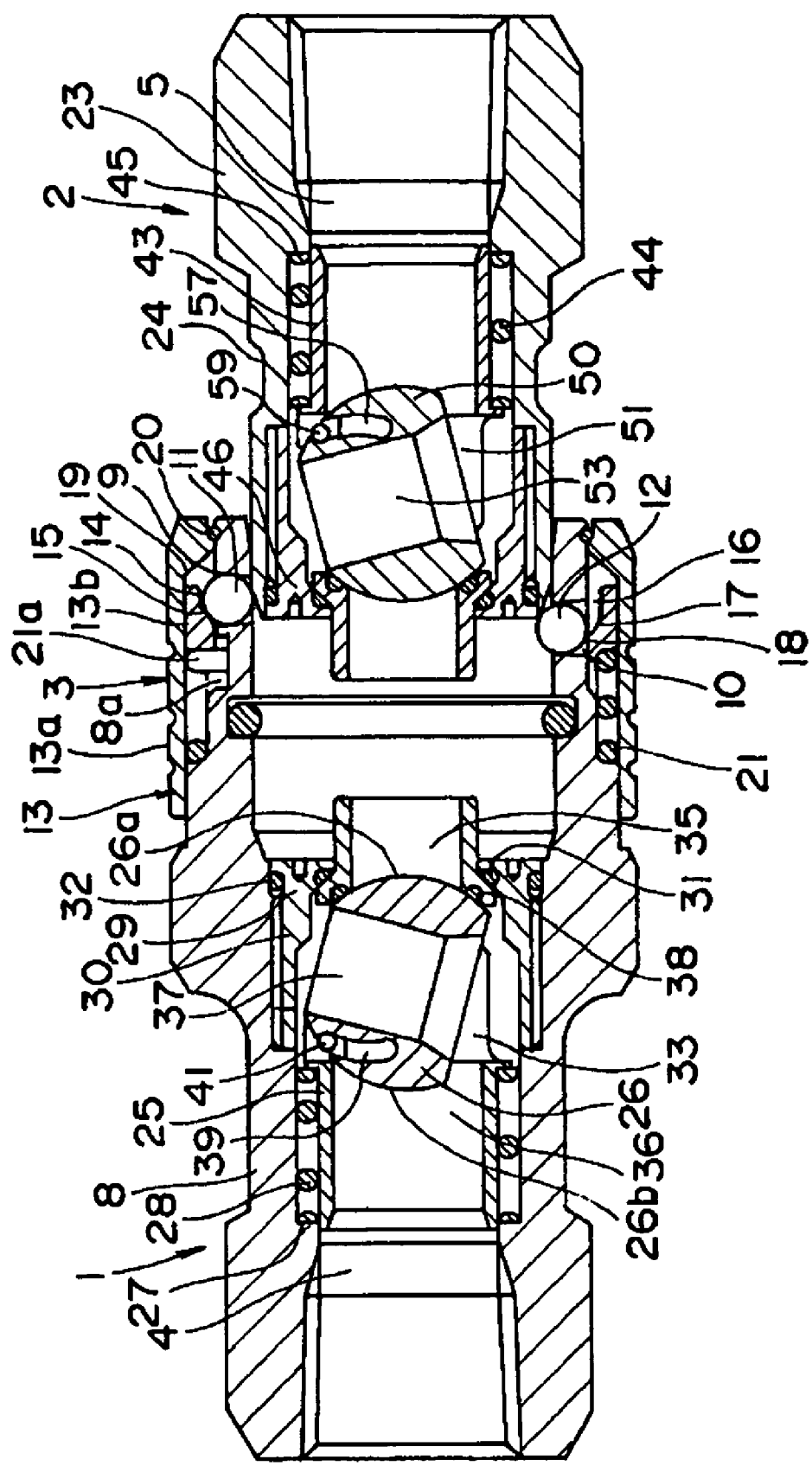
FIG. 21 is a longitudinal cross-sectional view of the fluid coupler of FIG. 1 in which the male coupler member is in a first stage of insertion into the female coupler member; and, FIG. 22 is a view similar to FIG. 21 in which the male coupler member is in a second stage of insertion into the female coupler member.
Figure 22:
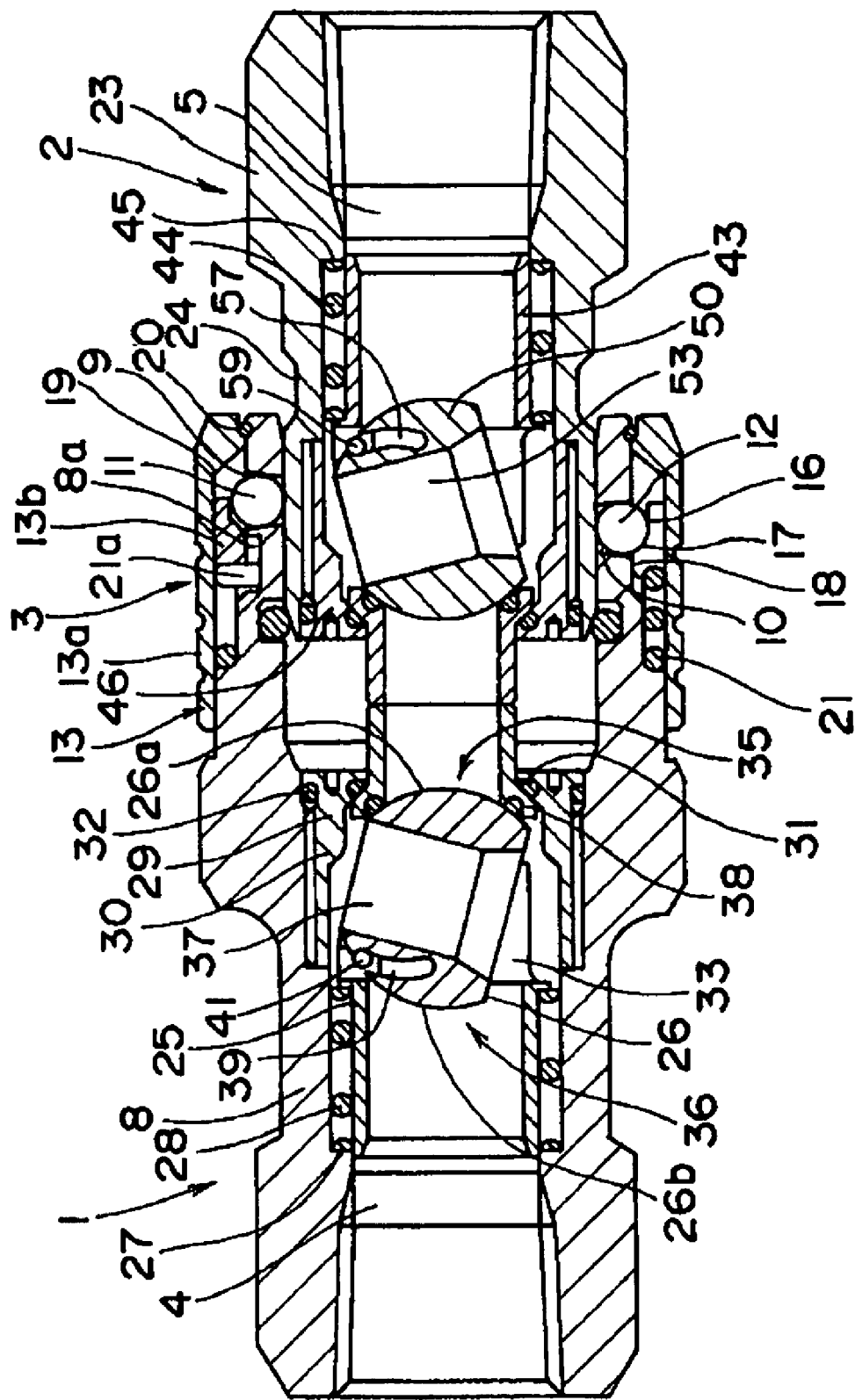

The locking ball confining ring 13b is surrounded by a sleeve 13a, and is urged by a coil spring 21 forwardly to engage with stepped portion 19 of the sleeve 13a so that the coil spring 21 and the sleeve 13a are urged to a position shown in FIG. 1 wherein the sleeve 13a and the locking ball confining ring 13b are stopped by a stop ring 20. A forward end 21a of the coil spring 21 is bent to extend radially inwardly and engage with a radially extending recess 22 (FIG. 9b) formed in the locking ball confining ring 13b; and, further, slidably engages with an axially extending groove 8a (FIGS. 1, 9a and 12) formed in an outer surface of the cylindrical member 8 so that the locking ball confining ring 13b is prevented from rotating about an axis thereof, while being permitted to axially move on the cylindrical member 8. FIGS. 9a and 9b illustrate a positional relationship between the radial through holes 9 and 10 and a configuration of the inner surface of the locking ball confining ring 13b.

Figure 3:
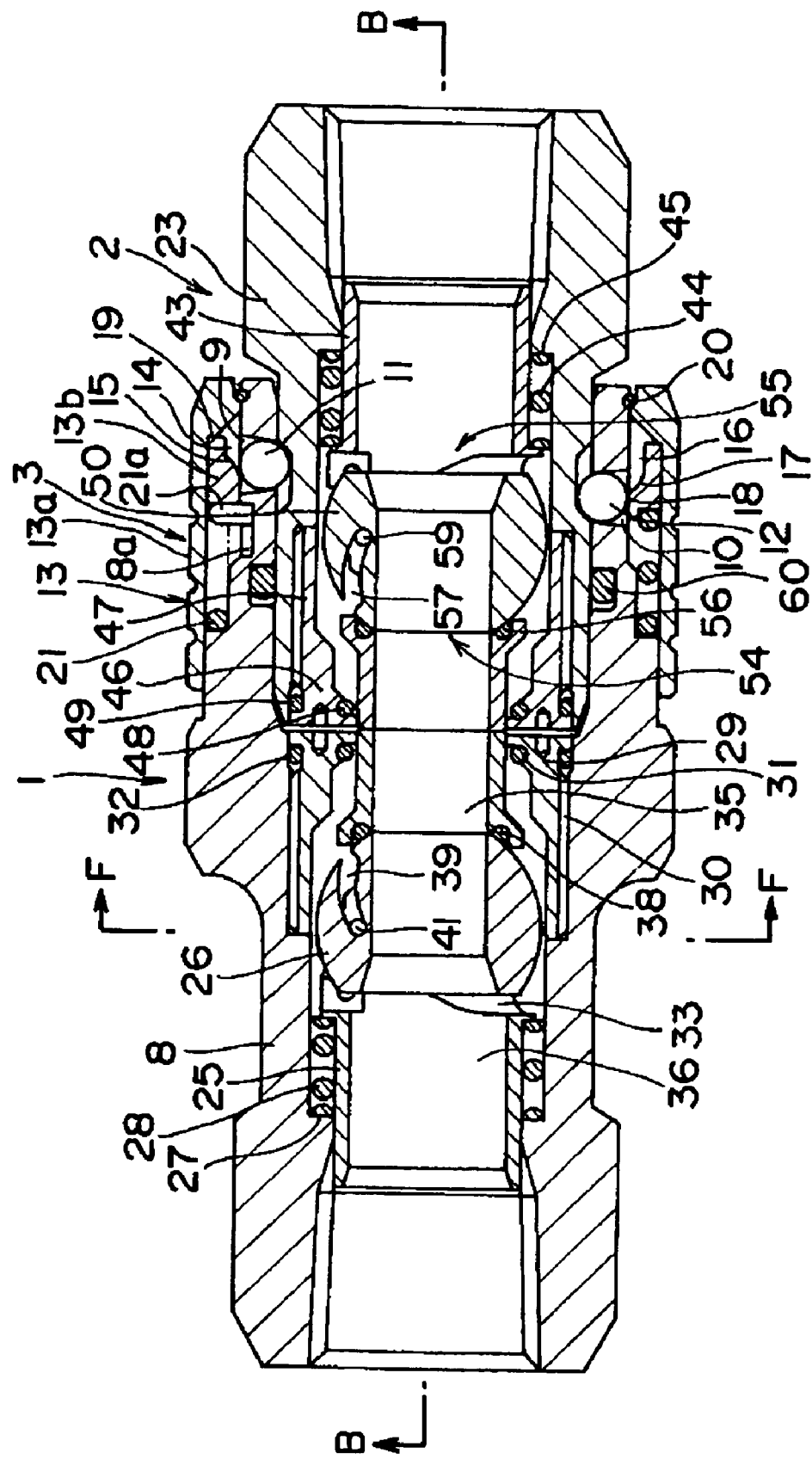
FIG. 3 is a longitudinal cross-sectional view of the fluid coupler shown in FIG. 1 in which the male and female coupler members are connected to each other.
Figure 4:
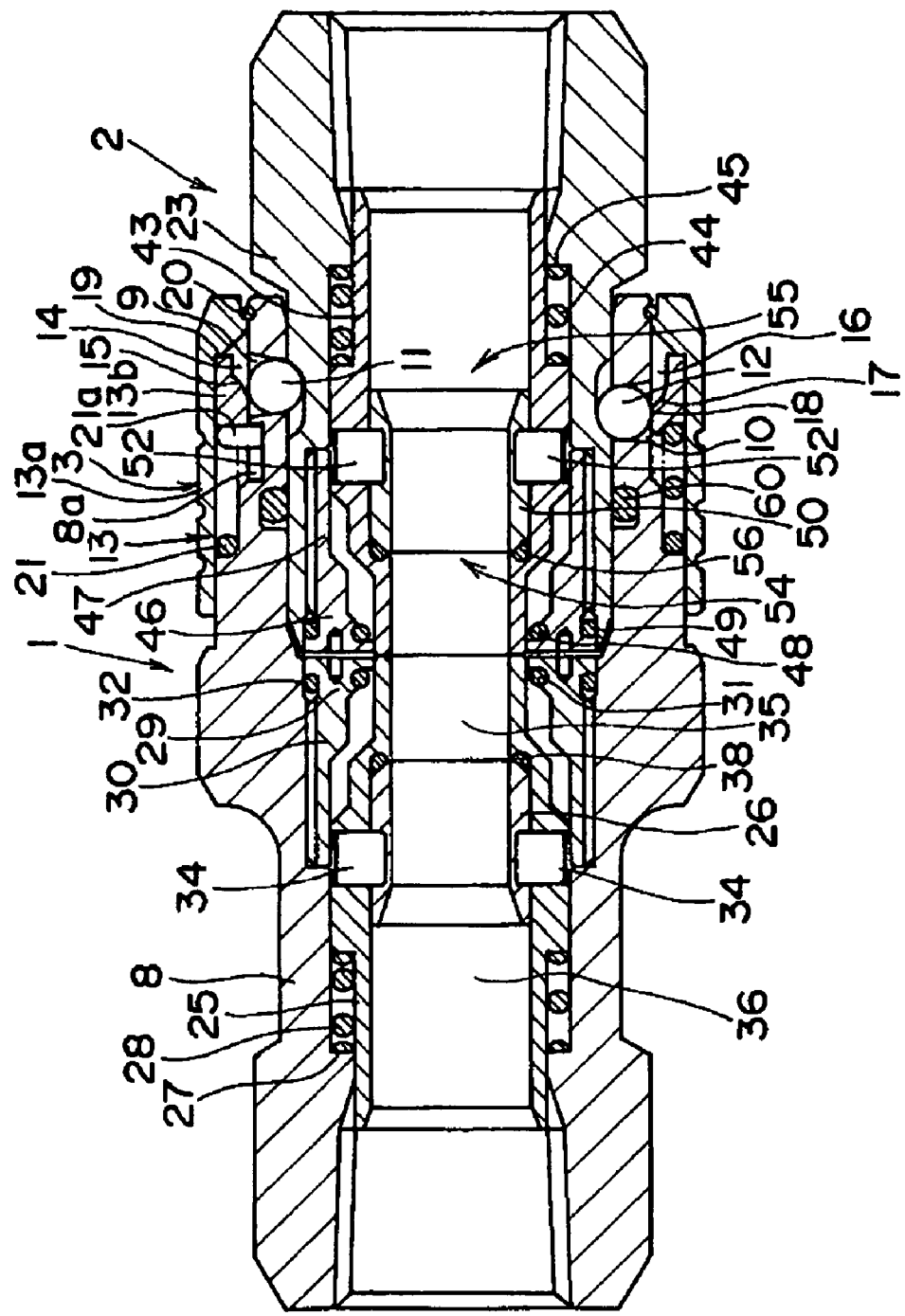
FIG. 4 is a view taken along line B—B in FIG. 3.

When the locking ball confining ring 13b is positioned at a forward end position as shown in FIG. 1, wherein the male coupler member 2 is not inserted into the female coupler member 1, or as shown in FIG. 3, wherein the male coupler member 2 is completely inserted into the female coupler member 1, the first locking balls 11 are engaged by a radially inward end portion of the first slanted portion 15 and partly extend into the axial through hole 4, while the second locking balls 12 are engaged by a second ball pressing portion 18 and partly extend into the axial through hole 4.

The male coupler member 2 has a cylindrical member 23 having an axial through hole 5. The cylindrical member 23 has a portion to be slidably inserted into the axial through hole 4 which is provided on its outer surface with a conical portion at a forward end thereof, and a locking ball receiving recess 24 at a rearward portion thereof.

Upon insertion of the male coupler member 2 into the female coupler member 1, as the male coupler member advances in the axial through hole 4 towards the left end of the axial through hole 4, as viewed in FIG. 1, the conical portion of the forward end of the male coupler member 2 first engages with the first locking balls 11 to urge the first locking balls 11 radially outwardly, whereby the locking ball confining ring 13b is advanced rearwards or leftwards to allow the locking balls to move radially outwardly and, thus, the male coupler member 2 to continue its advancement. When the conical portion of the forward end of the male coupler member 2 comes into engagement with the second locking balls 12, the second locking ball pressing surface 18 has been moved rearwards to disengage from the second locking balls 12. As the male coupler member 2 is further advanced, the male coupler member urges the second locking balls 12 radially outwardly to further move the locking ball confining ring 13b rearwards. When the male coupler member 2 has reached a connection position where the male coupler member 2 is completely inserted into the female coupler member 1, the locking ball receiving recess 24 of the male coupler member 2 is radially aligned with the first and second radial through holes 9 and 10, thereby allowing the locking ball confining ring 13b to be returned by the coil spring 21 to its forward position while forcibly moving the locking balls 11 and 12 radially inwardly into the locking ball receiving recess 24. As a result, the first locking balls 11 are pressed by the slanted surface 15 and the second locking balls 12 are pressed by the second locking ball pressing surface 18 (FIG. 3). As will be apparent from the foregoing explanation, an operator can effect insertion of the male coupler member 2 by holding the sleeve 3a. As shown in the accompanying drawings, both the female coupler member 1 and the male coupler member 2 have valve mechanisms 6 and 7 which are provided in the axial through holes 4 and 5, respectively. Since the valve mechanisms 6 and 7 have the same construction, detailed explanation of only the valve mechanism 6 will be given below, so as to avoid unnecessary repetition.

The valve mechanism 6 of the female coupler member comprises a slidable valve holder 25 axially slidably disposed in the axial through hole 4, and a rotatable valve 26. The slidable valve holder 25 is urged by a coil spring 28 forward and, when the male coupler member 2 is not inserted into the female coupler member 1, is urged against a cylindrical stop 29 which is securely mounted on an interior surface of the axial through hole 4 by means of screw threads 30.

Figure 2:
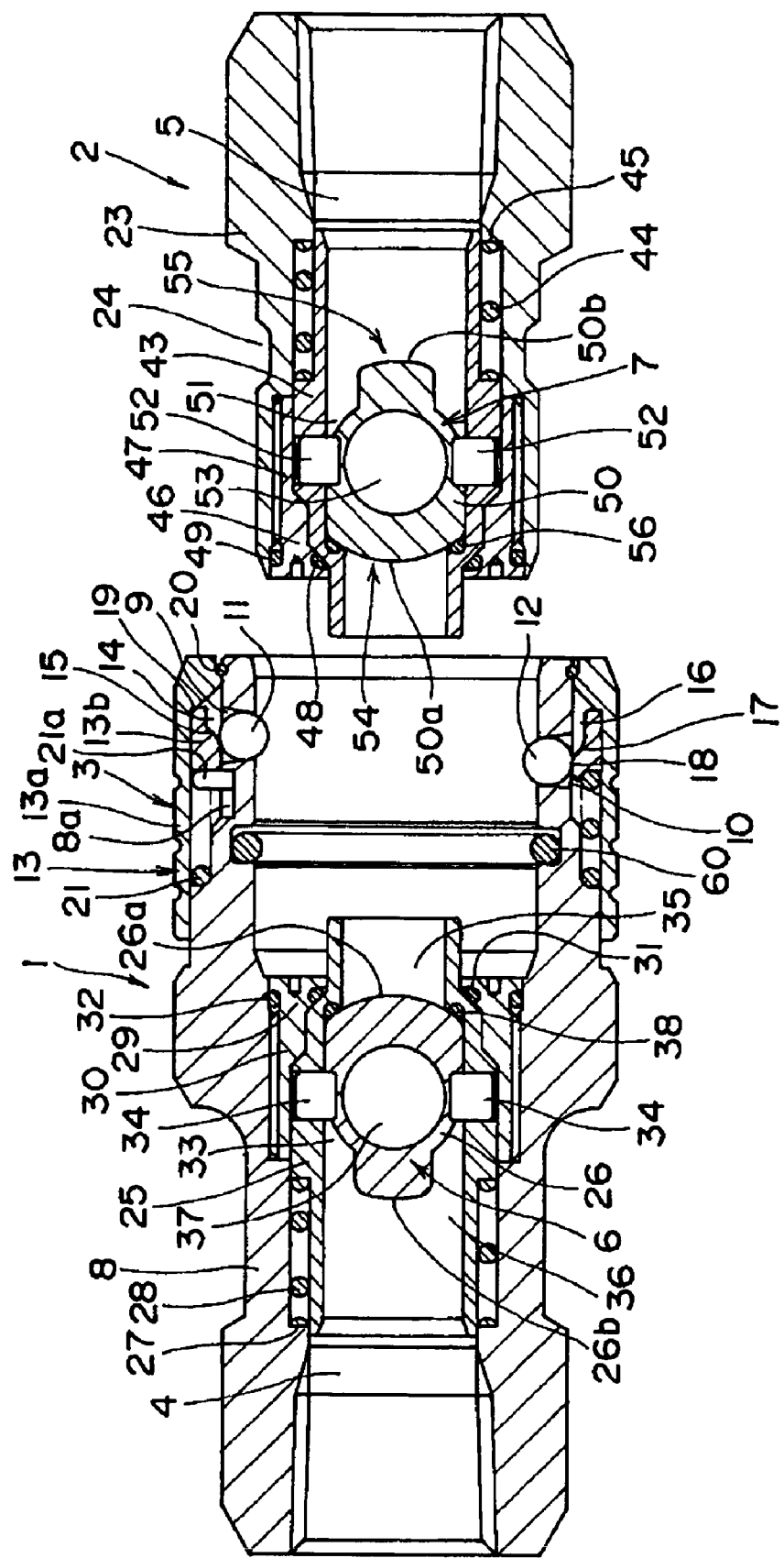
FIG. 2 is a view taken along line A—A in FIG. 1.
Figure 10:
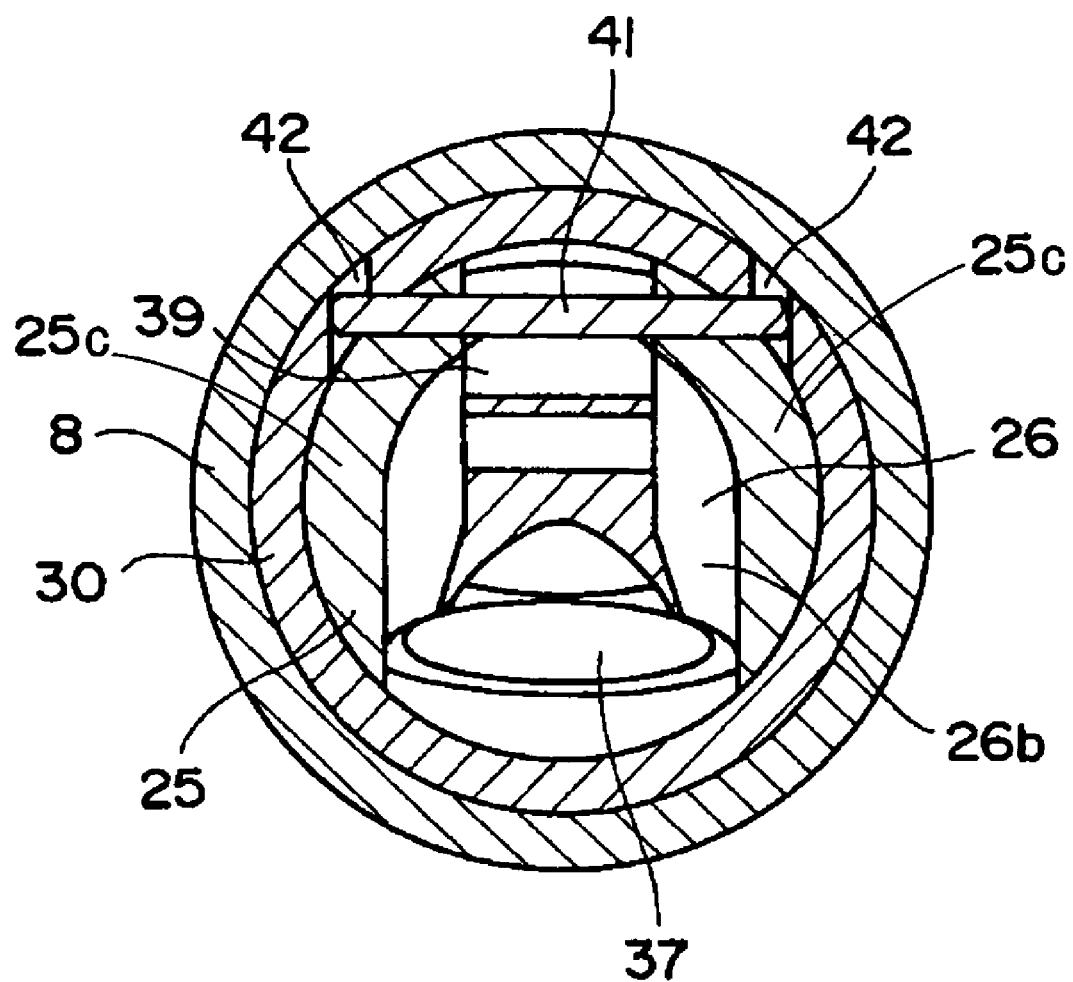
FIG. 10 is a view taken along line E—E in FIG. 1.
Figure 11:
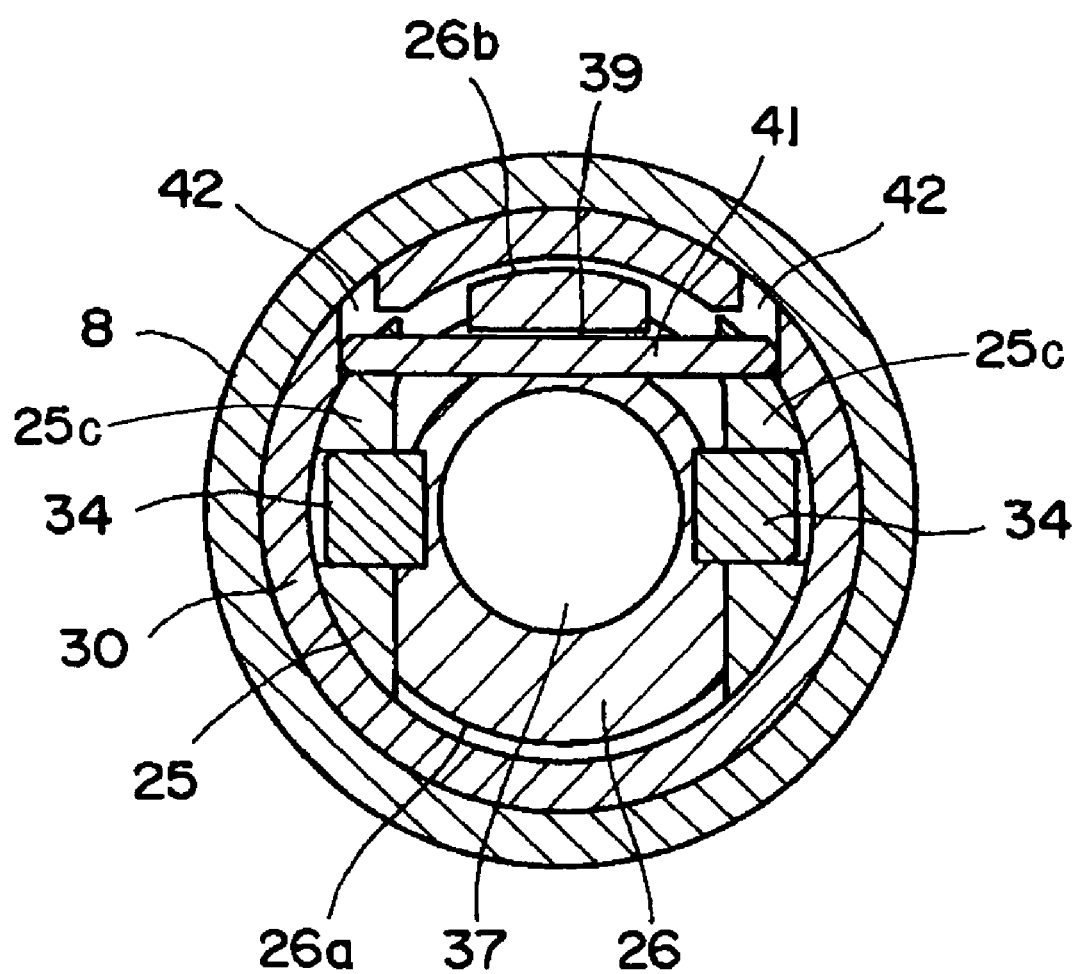
FIG. 11 is a view taken along line F—F in FIG. 3.

As shown in FIGS. 1 and 2, the slidable valve holder 25 has a forward cylindrical portion 25a with a though hole 35, a rearward cylindrical portion 25b with a through hole 36, and an intermediate portion 33 with a though hole 37 positioned between the forward and rearward cylindrical portions. The intermediate portion 33 has right and left side walls supporting the rotatable valve 26 with a pair of pivotal shafts 34, 34 which are positioned at opposite sides of the rotatable valve 26 and aligned with each other along a pivotal axis normal to an axis of the axial through hole 4. The rotatable valve 26 is rotatable between an opening angular position shown in FIG. 3, in which the through hole 37 is axially aligned with the through hole 35 of the forward cylindrical portion and the through hole 36 of the forward cylindrical portion, and a closing angular position shown in FIG. 1, in which the through hole 37 is aligned with neither the axial through hole 35 of the forward cylindrical portion nor the through hole 36 of the forward cylindrical portion, and an outer surface 26a of the rotatable valve sealingly engages with a sealing ring 38 provided around an opening end of axial through hole 35 to prevent fluid from flowing through the valve mechanism. Between the valve mechanism 6 and the cylindrical member 8, there is provided a cam mechanism for moving the rotatable valve 26 between the opening angular position (FIG. 3) and the closing angular position (FIG. 1) stated above. The cam mechanism has a cam profile hole 39 extending through a portion 26b of the rotatable valve 26 in a direction of the pivotal axis of the rotatable valve 26 and along a cam profile in a plane normal to the pivotal axis and, a pin 41 arranged such that the pin extends through the cam profile hole 39 parallel to the pivotal axis. The cam profile hole 39 is profiled such that when the slidable valve holder 25 is moved between the opening position (FIG. 3) and the closing position (FIG. 1), the pin 41 engages with a wall defining the cam profile hole 39 so that the pin 41 imposes a rotational force on the rotatable valve 26 to rotate the rotatable valve between the opening angular position (FIG. 3) and the closing angular position (FIG. 1). In the embodiment illustrated in the drawings, opposite ends of the pin 41 pass inclined elongated holes 40, 40 (FIGS. 13, 14, 17 and 18) formed in the left and right walls of the intermediate portion 33 of the slidable valve holder 25 and engage with a pair of rectangular holes 42, 42 (FIGS. 10-12) formed in the cylindrical stop 29. Each hole 42 vertically extends through the cylindrical stop 29 and has a rectangular cross section. An axial length of the cross section of the hole 42 is slightly larger than a diameter of the pin 41 to substantially prevent the pin 41 from moving in an axial direction. When the slidable valve holder 25 is moved between the closing position and the opening position, walls of the inclined elongated holes 40, 40 cooperate with walls of rectangular holes 42, 42 to slightly move the pin 41 vertically (FIGS. 10 and 11). In FIG. 1, 31, 32 and 60 denote sealing rings.

The valve mechanism set forth above is distinguishable from the type of valve mechanism employed in a prior art fluid coupler member in which forward and rearward cylindrical portions of a slidable valve holder are separated from each other and a rotatable valve is held by the forward and rearward cylindrical portions which are urged against the rotatable valve by a spring in such a manner that the rotatable valve is rotated by a cam mechanism similar to that of the present invention as explained above. In the prior art valve mechanism, due to the construction described above, when the slidable valve holder is axially moved between opening and closing positions, a large friction force is generated between the rotatable valve and the forward and rearward cylindrical portions. In contrast, since the rotatable valve of the valve mechanism of the present invention is pivotally supported by pivotal shafts and, only a small friction force is generated between the rotatable valve and the forward and rearward cylindrical portions, which enables an operator to insert the male coupler member into the female coupler member using little force as compared with the prior art valve mechanism. Generation of only a small friction force between the rotatable valve and the forward and rearward cylindrical portions also allows the valve mechanism of the present invention to have a long working life.

The valve mechanism 7 of the male coupler member 2 is substantially the same as the valve mechanism 6 of the female coupler member 1 and comprises, as main elements, a slidable valve holder 43, a rotatable valve 50 with a cam profile hole 7, and a pin 59 extending through the cam profile hole 7.

Although the present invention has been described in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A fluid coupler comprising:
   a female coupler member; and
   a male coupler member;
   wherein said female coupler member comprises:
   (i) a cylindrical member including an axial through hole having a first opening end for receiving said male coupler member and a second opening end opposite to said first opening end, said cylindrical member further including
      (a) a first radial through hole radially extending through said cylindrical member, and
      (b) a second radial through hole radially extending through said cylindrical member, said first radial through hole being positioned nearer to said first opening end than is said second radial through hole;
   (ii) a first locking ball received in said first radial through hole such that said first locking ball is radially movable in said first radial through hole;
   (iii) a second locking ball received in said second radial through hole such that said second locking ball is radially movable in said second radial through hole;
   (iv) a locking ball confining ring axially slidably disposed around said cylindrical member and having an inner surface including
      (a) a first locking ball relieving portion enabling said first locking ball to move radially outwardly to allow said male coupler member to be inserted into said axial through hole passing said first locking ball,
      (b) a first slanted portion extending radially inwardly from said first locking ball relieving portion in a direction toward one of said first and second opening ends, said first slanted portion being axially aligned and engaged with said first locking ball,
      (c) a second locking ball relieving portion enabling said second locking ball to move radially outwardly to allow said male coupler member to advance in said axial through hole passing said second locking ball,
      (d) a second slanted portion extending radially inwardly from said second locking ball relieving portion in the direction toward said one of said first and second opening ends, said second slanted portion being axially aligned and engaged with said second locking ball; and
      (e) a second locking ball pressing portion axially extending from a radially inward end of said second slanted portion; and
   (v) a spring urging said locking ball confining ring towards the other of said first and second opening ends; and
   wherein
   (1) when said male coupler member is not inserted into said female coupler member, said first locking ball is engaged by said first slanted portion to partly extend into said axial through hole, and said second locking ball is engaged by said second ball pressing portion to partly extend into said axial through hole,
   (2) when said first locking ball is engaged by said male coupler member, which is being inserted into said axial through hole from said first opening end, said first locking ball is forcibly moved radially outwardly while moving said locking ball confining ring in an axial direction under a force applied by said first locking ball to said first slanted portion, thereby allowing said male coupler member to advance into said axial through hole, (3) when said male coupler member comes into engagement with said second locking ball after passing said first locking ball, said locking ball confining ring has been moved such that said locking ball pressing portion disengages from said second locking ball, thereby allowing said second locking ball to be moved radially outwardly to allow said male coupler member to advance further; and (4) said male coupler member has an annular groove formed in an outer surface thereof which is radially aligned with said first and second locking balls, which have been moved radially outwardly to said first and second locking ball relieving portions, respectively, to receive said first and second locking balls thereinto so that said locking ball confining ring is returned by said spring to an initial position which said locking ball confining ring takes when said male coupler member is not inserted into said axial through hole of said female coupler member.

2. The fluid coupler according to claim 1, wherein said second slanted portion is designed so that when said second locking ball pressing portion is disengaged from said second locking ball, said second slanted portion engages with said second locking ball and, as said male coupler member advances while engaging with said second locking ball, said second locking ball is forced against said second slanted portion to thereby move said locking ball confining ring axially against said spring.

3. The fluid coupler according to claim 1, further comprising:
a sleeve, axially movably disposed around said cylindrical member, interposing said locking ball confining ring between said cylindrical member and said sleeve,
wherein said sleeve is designed so that, when said sleeve is moved towards said one of said first and second opening ends, said sleeve engages with and moves said locking ball confining ring against said spring to a position such that said first and second locking ball relieving portions are radially aligned with said first and second locking balls, respectively.

4. The fluid coupler according to claim 2, wherein said inner surface of said locking ball confining ring further includes:
(i) a first annular surface having a predetermined axial length;
(ii) a second annular surface axially spaced away from said first annular surface and having a predetermined axial length and a diameter smaller than that of said first annular surface;
(iii) a slanted annular or conical surface extending between said first and second annular surfaces; and
(iv) a recess extending from a portion on said second annular surface adjacent to said slanted or conical annular surface and extending along said slanted or conical annular surface towards said first annular surface;

with
(a) said first locking ball relieving portion being formed by said first annular surface;
(b) said first slanted portion being formed by said slanted or conical annular surface;
(c) said second slanted portion being formed by said recess;
(d) said second locking ball pressing portion being formed by a portion of said second annular surface, which portion is axially aligned with said recess; and
(e) said second locking ball relieving portion being formed by a portion of said recess, a diameter of which is the same as that of said first annular surface.

5. A coupler member of a fluid coupler, comprising:
a cylindrical member having an axial through hole; and
a valve mechanism disposed in said axial through hole, said valve mechanism including
(i) a valve holder slidably disposed in said axial through hole, said valve holder being axially movable in said axial though hole between an opening position and a closing position,
(ii) a rotatable valve,
(iii) a pivotal shaft for pivotally supporting said rotatable valve about a pivotal axis extending transversely with respect to said valve holder, and
(iv) a cam mechanism for effecting a rotational movement of said rotatable valve about said pivotal axis between an opening angular position wherein said rotatable valve allows fluid to flow through said coupler member, and a closing angular position wherein said rotatable valve prevents fluid from flowing through said coupler member in response to movement of said valve holder between said opening position and said closing position, respectively;
said cam mechanism having a cam profile hole extending through said rotatable valve, and a pin arranged such that said pin extends through said cam profile hole,
wherein said cam profile hole cooperates with said pin such that when said valve holder is moved between said opening and closing positions, said pin engages with a wall defining said cam profile hole so that said rotatable valve is rotated between said opening angular position and said closing angular position.

6. The coupler member according to claim 5, wherein said cam profile hole extends in a direction of said pivotal axis and along a cam profile in a plane normal to said pivotal axis, and
said pin extends parallel to said pivotal axis.

7. The coupler member according to claim 6, wherein said pin is held in a predetermined position in a direction of an axis of said axial through hole such that said pin is movable in a plane normal to said axis of said axial through hole.

8. The coupler member according to claim 7, wherein said valve holder comprises a first cylindrical portion having a first axial through hole, an intermediate portion and a second cylindrical portion having a second axial hole, which are successively arranged in this order along an axis of said valve holder,
said intermediate portion has left and right side walls extending between said first and second cylindrical portions to rotatably hold said rotatable valve between said left and right side walls with a pair of pivotal shaft portions which are respectively positioned between said rotatable valve and said left and right walls along said pivotal axis to rotatably support said rotatable valve about said pivotal axis, with said pair of pivotal shaft portions defining said pivotal shaft, said left and right side walls have inclined elongated holes which are aligned with each other in a direction of said pivotal axis, said pin passes through said inclined elongated holes and is supported by said cylindrical member such that said pin is movable in said plane normal to said axis of said axial through hole, said rotatable valve has a through hole which is in axial alignment with said first and second axial through holes to allow fluid to flow through said coupler member when said rotatable valve is in said opening angular position, and which is out of said axial alignment with said first and second axial through holes when said rotatable valve is in said closing angular position, and when said valve holder is moved between said opening position and said closing position, said pin is slidably engaged by walls of said inclined elongated holes to thereby be moved in said plane normal to said axis of said axial through hole.

9. A fluid coupler comprising:
a female coupler member; and
a male coupler member;
wherein said female coupler member comprises:
 (i) a cylindrical member including an axial through hole having a first opening end for receiving said male coupler member and a second opening end opposite to said first opening end, said cylindrical member further including
  (a) a first radial through hole radially extending through said cylindrical member, and
  (b) a second radial through hole radially extending through said cylindrical member, said first radial through hole being positioned nearer to said first opening end than is said second radial through hole;
 (ii) a first locking ball received in said first radial through hole such that said first locking ball is radially movable in said first radial through hole;
 (iii) a second locking ball received in said second radial through hole such that said second locking ball is radially movable in said second radial through hole;
 (iv) a locking ball confining ring axially slidably disposed around said cylindrical member and having an inner surface including
  (a) a first locking ball relieving portion enabling said first locking ball to move radially outwardly to allow said male coupler member to be inserted into said axial through hole passing said first locking ball,
  (b) a first slanted portion extending radially inwardly from said first locking ball relieving portion in a direction toward one of said first and second opening ends, said first slanted portion being axially aligned and engaged with said first locking ball,
  (c) a second locking ball relieving portion enabling said second locking ball to move radially outwardly to allow said male coupler member to advance in said axial through hole passing said second locking ball,
  (d) a second slanted portion extending radially inwardly from said second locking ball relieving portion in the direction toward said one of said first and second opening ends, said second slanted portion being axially aligned and engaged with said second locking ball; and
  (e) a second locking ball pressing portion axially extending from a radially inward end of said second slanted portion; and
 (v) a spring urging said locking ball confining ring towards the other of said first and second opening ends; and
 wherein
  (1) when said male coupler member is not inserted into said female coupler member, said first locking ball is engaged by said first slanted portion to partly extend into said axial through hole, and said second locking ball is engaged by said second ball pressing portion to partly extend into said axial through hole,
  (2) when said first locking ball is engaged by said male coupler member, which is being inserted into said axial through hole from said first opening end, said first locking ball is forcibly moved radially outwardly while moving said locking ball confining ring in an axial direction under a force applied by said first locking ball to said first slanted portion, thereby allowing said male coupler member to advance into said axial through hole,
  (3) when said male coupler member comes into engagement with said second locking ball after passing said first locking ball, said locking ball confining ring has been moved such that said locking ball pressing portion disengages from said second locking ball, thereby allowing said second locking ball to be moved radially outwardly to allow said male coupler member to advance further; and
  (4) said male coupler member has an annular groove formed in an outer surface thereof which is radially aligned with said first and second locking balls, which have been moved radially outwardly to said first and second locking ball relieving portions, respectively, to receive said first and second locking balls thereinto so that said locking ball confining ring is returned by said spring to an initial position which said locking ball confining ring takes when said male coupler member is not inserted into said axial through hole of said female coupler member, and
 wherein said female coupler member further comprises:
 a valve mechanism disposed in said axial through hole, said valve mechanism including:
  (i) a valve holder slidably disposed in said axial through hole said valve holder being axially movable in said axial though hole between an opening position and a closing position,
  (ii) a rotatable valve,
  (iii) a pivotal shaft for pivotally supporting said rotatable valve about a pivotal axis extending transversely with respect to said valve holder, and
  (iv) a cam mechanism for effecting a rotational movement of said rotatable valve about said pivotal axis between an opening angular position wherein said rotatable valve allows fluid to flow through said female coupler member, and a closing angular posi tion wherein said rotatable valve prevents fluid from flowing through said female coupler member in response to movement of said valve holder between said opening position and said closing position, respectively;

said cam mechanism having a cam profile hole extending through said rotatable valve, and a pin arranged such that said pin extends through said cam profile hole, wherein said cam profile hole cooperates with said pin such that when said valve holder is moved between said opening and closing positions, said pin engages with a wall defining said cam profile hole so that said rotatable valve is rotated between said opening angular position and said closing angular position.

* * * * *